April 17, 1956
G. GOETTL
2,742,322
FLOW CONTROL TIP FOR WATER DISTRIBUTION
PIPES OF EVAPORATIVE COOLERS
Filed July 20, 1955
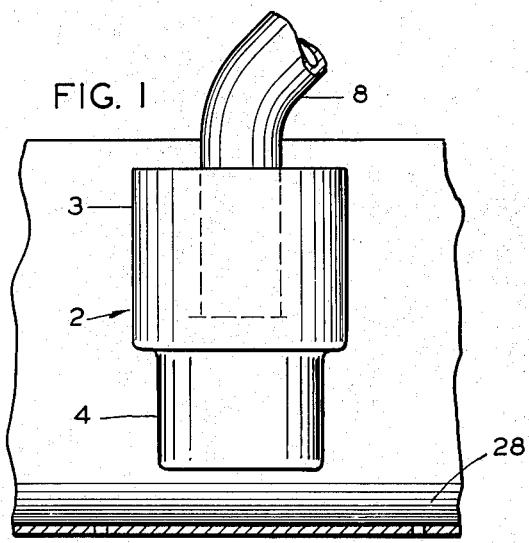
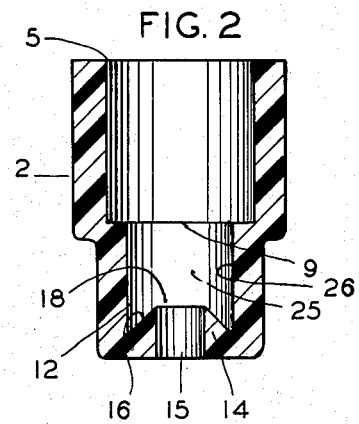
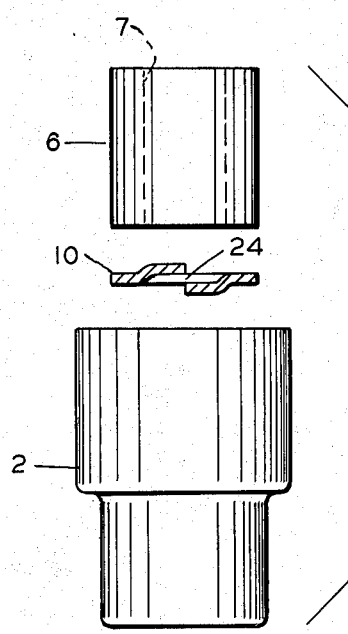
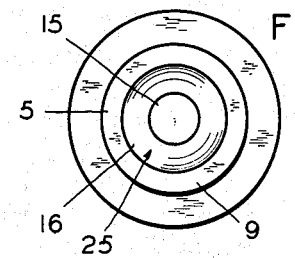
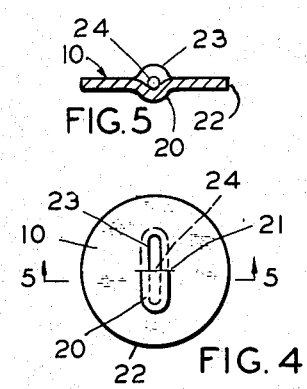
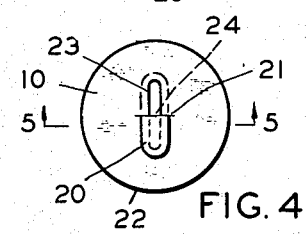
INVENTOR.
Gust Goettl
BY
Scott L. Norviel
Attorney

United States Patent Office 2,742,322
Patented Apr. 17, 1956

2,742,322

FLOW CONTROL TIP FOR WATER DISTRIBUTION PIPES OF EVAPORATIVE COOLERS

Gust Goettl, Phoenix, Ariz.

Application July 20, 1955, Serial No. 523,283

2 Claims. (Cl. 299—107)

This invention concerns flow control tips for the ends of water distribution pipes in evaporative coolers.

Heretofore evaporative coolers having pads held in a case and arranged peripherally of the case have been wetted by water furnished through tubes that radiate from a centrally located water distribution head. This distribution head is connected to a water supply which furnishes a flow of water at a predetermined pressure. The head serves to divide the flow so that it goes to each of the several distribution pipes equally. These pipes, in turn, deliver the water into troughs having perforated bottoms, disposed at the top of evaporative pads.

To secure efficient operation of coolers of this type it is necessary to provide the pads with an even flow of water from the perforations in the trough, and to do this it is necessary for the distribution pipes to provide the trough with an even flow of water at a predetermined rate throughout its entire length. Water must be furnished in a manner so that it will flow along the entire length of each of the pad troughs in adequate volume, but will not splash out of the troughs during any part of the operation.

When water is supplied to the head under considerable pressure, as is the case when the supply line is connected directly to the city water pipes, water is apt to flow from the ends of the distribution pipes with such force that it splashes out of the trough and flows over the sides at a position adjacent to the pipe.

When flow is diminished and there is not volume or enough head pressure to provide a definite end pressure to all of the pipes, and in case the installation is not accurately levelled, the pipes on the lower side tend to draw an excessive amount of water due to a siphoning action together with the normal head pressure flow. Heretofore such distribution pipes have, for the most part, been cut off squarely at the ends and no attempt has been made to regulate the flow at their ends. The only attempt to regulate the flow has been by altering the size of the orifices in the distribution head of the water system but this head, positioned as it is under the top plate of the case is very inaccessible and regulation by this means has been unsuccessful.

One of the objects of this invention is to provide a metering tip for the ends of evaporative cooler distribution pipes, which is easily and cheaply made and which can be applied and regulated easily and without changing the distribution head, pinching the pipes, or otherwise altering the original installation.

Another object is to provide such a metering tip, which is composed of easily moulded materials that will not corrode and to which calcium deposits are unlikely to attach.

Another object is to provide a metering tip which can be easily and quickly attached to and removed from the ends of distribution pipes and which contains a washer with a directive orifice of a size that can be varied to suit operating conditions.

Still another object is to provide a metering tip, as above described, which will divert and dissipate the kinetic energy of the water flow and reduce the velocity of the flow so that the water will leave the tip at a low velocity and will not splash over the sides of the cooler pad distribution trough, nor be apt to run to one end or the other of said trough.

Other objects will appear hereinafter.

I attain the foregoing objects by means of the devices and combination of parts illustrated in the accompanying drawings in which—

Figure 1 is a side elevation of a distribution tip embodying my improvements together with a fragment of a distribution trough;

Figure 2 is a vertical mid-sectional view of the outer shell of the tip;

Figure 3 is a plan view thereof;

Figure 4 is a plan view of the flow directive washer;

Figure 5 is a section taken substantially on lines 5—5; and

Figure 6 is an exploded view of the several parts of the tip.

Similar numerals refer to similar parts in the several views.

The body 2 of the shell of the metering tip is composed of hard rubber or a mouldable plastic composition such as, for example, Bakelite. This body has a general cylindrical shape. The upper portion 3 has a somewhat larger diameter than the lower portion 4. The upper portion has a round axially positioned hole 5 which receives a bushing 6 of soft resilient material. The bushing 6, in turn, has a hole 7 slightly smaller than the outside diameter of the distribution pipe 8 on which it is to be used. The resilient material of the bushing thereby provides a means for removable retention of the tip on the end of the distribution pipe.

At the bottom of body hole 5 there is an annular shelf 9 which receives and supports a washer 10 which is held in place by the bushing 6.

Below the shelf 9 an axial bore 12 of lesser diameter than hole 5 extends through the lower portion of the body 4 to the bottom closure 14. Within closure 14 there is an axial bore 15 of still smaller diameter. At the upper end of this bore there is a recessed annular shelf provided with an annular angularly and outwardly and downwardly slanting face 16. This face terminates by joining the walls of bore 15 with a comparatively sharp annular edge 18.

The washer 10 is provided with a radially extending creased depression 20 which extends from a transverse radial cut 21 outward toward its peripheral edge 22. On the opposite side of cut 21 there is a raised crease 23 which also extends outward. These two creases, one extending downward and the other raised upward, provide a directive opening through the washer which vents substantially radially relative to the center of the washer.

Water flowing from the distribution pipe 8 will flow against said washer and out through the radial hole 24 provided by the two offset creases above mentioned. This flow will strike the side of the body chamber 25 below the washer and normally will take a somewhat circular path around the inner face of this chamber. The flow will descend along the wall 26 of the chamber until it strikes the outer annular edge of the upper face 16 of the bottom closure 14. The flow will then run over the edge 18 of this face and exit through the central hole 15 of the body at a reduced velocity.

The velocity of the flow from hole 24 is diminished in chamber 25 and the water leaves exit hole 15 at such a slow rate of flow that it does not splash over the side walls of V distribution trough 28. The water issuing from the tip, therefore, flows toward both ends of this trough and is distributed evenly from the entire length of the trough to the top of the cooler pad.

From the foregoing it will be understood that the body of the tip 2 is resiliently held on pipe 8 by bushing 6 and may, therefore, be easily removed and replaced for the purpose of changing washer 10. Also, since the washer hole 24 is protected from air drafts, scale and salts dissolved in the water do not form around it and tend to close it. Any such encrustation will instead, form around the lower end of exit hole 15 which is much larger and has sufficient area so that it is unlikely to be obstructed in this manner.

I claim:

1. In an evaporative cooler, a flow regulating tip for the ends of water distributing pipes for the evaporative pads consisting of a substantially cylindrical body having an axial bore, within its upper end providing a bushing cavity, an axial bore of lesser diameter below said cavity providing an annular washer retaining shelf at the bottom of said cavity and a flow decelerating chamber and an axial exit bore within the lower portion of said body of lesser diameter than said chamber, and an annular shelf at the bottom of said chamber slanting inwardly and upwardly forming an annular spill over inner annular edge, a cylindrical bushing of resilient material fitted into said bushing cavity, having an axial bore adapted to fit on a water distribution pipe, and a flow regulating washer retained on the shelf at the bottom of said bushing cavity by said bushing having a centrally located slot and flow channels extending therefrom on opposite faces providing a centrally disposed orifice directing a flow of water radially toward the inner wall of said decelerating chamber.

2. A flow control tip for application to the outer end of a water distribution pipe in an evaporative cooler, consisting of a substantially cylindrical body having a top and a bottom, and having an upper axial bore in the top portion of said body adapted to receive a cylindrical bushing of resilient material, a bore of reduced diameter extending downwardly from said upper bore providing an annular shelf at the bottom of said upper bore, and providing a body chamber, a bottom closure for said chamber having an axial exit opening of a smaller diameter than said chamber bore and an annular upper face slanting outwardly and downwardly toward the inner wall of said body chamber and providing a spill-over lip around the upper end of said exit opening, a washer disposed on the annular shelf in said body having a centrally positioned slit with an upward radial crease on one side and a depressed radial crease on the opposite side providing a horizontally directed radial hole, and a cylindrical bushing of resilient material fitted into said upper body bore, holding said washer on said annular shelf and having an axial bore adapted to receive and grip said distribution pipe.

References Cited in the file of this patent

UNITED STATES PATENTS

| | | |
|---|---|---|
| 1,656,160 | Badaracco | Jan. 17, 1928 |
| 2,087,139 | Cameron | July 13, 1937 |
| 2,220,227 | Gifford | Nov. 5, 1940 |
| 2,308,476 | Gerrer | Jan. 12, 1943 |